(12) United States Patent
Bradford et al.

(10) Patent No.: US 11,825,826 B1
(45) Date of Patent: Nov. 28, 2023

(54) DEVICE FOR THE STORAGE AND TRANSPORT OF FISHING TACKLE

(71) Applicant: TackleTower, LLC, Fairhope, AL (US)

(72) Inventors: Brent Bradford, Fairhope, AL (US); John L. Welsh, Alexandria, VA (US); John Shaw, Birmingham, AL (US)

(73) Assignee: TACKLETOWER, LLC, Fairhope, AL (US)

( * ) Notice: Subject to any disclaimer, the term of this patent is extended or adjusted under 35 U.S.C. 154(b) by 725 days.

(21) Appl. No.: 16/254,941

(22) Filed: Jan. 23, 2019

Related U.S. Application Data

(60) Provisional application No. 62/621,806, filed on Jan. 25, 2018.

(51) Int. Cl.
*A01K 97/06* (2006.01)
*B63B 25/28* (2006.01)

(52) U.S. Cl.
CPC .............. *A01K 97/06* (2013.01); *B63B 25/28* (2013.01)

(58) Field of Classification Search
CPC ........ A01K 97/06; A01K 97/04; A01K 97/08; B63B 25/28
USPC ..... 43/54.1; 206/315.11, 6.1, 348, 461, 467, 206/468; 224/920, 400, 401, 406; 220/475, 476, 480, 200, 345.1, 345.2, 220/729, 259.3, 293, 298, 300; 248/121, 248/122.1, 125.1, 125.8, 200, 205.1, 248/218.4, 219.1, 219.2, 220.21, 220.22, 248/309.1, 309.2; 222/173, 609, 610
See application file for complete search history.

(56) References Cited

U.S. PATENT DOCUMENTS

| | | | | |
|---|---|---|---|---|
| 742,040 A | * | 10/1903 | Kurtz | A01K 97/06 206/315.11 |
| 1,539,915 A | | 6/1925 | Shebat | |
| 1,566,860 A | * | 12/1925 | Hainzigianis | A47K 1/09 312/312 |
| 1,624,233 A | * | 4/1927 | Griffin | A01K 97/06 43/57.1 |
| 1,728,473 A | * | 9/1929 | Brosius | A24F 13/14 D19/135 |
| 1,866,126 A | * | 7/1932 | Payson | A47J 39/02 312/405.1 |
| 1,884,805 A | * | 10/1932 | Moritz | B65H 54/543 242/130 |
| 2,225,309 A | * | 12/1940 | Lawrence | A01K 97/06 43/57.2 |
| 2,596,896 A | * | 5/1952 | Goad | A01K 97/16 43/57.2 |

(Continued)

*Primary Examiner* — Peter M Poon
*Assistant Examiner* — Kari A Bradberry
(74) *Attorney, Agent, or Firm* — WELSH FLAXMAN & GITLER LLC

(57) ABSTRACT

A device for the transport and storage of fishing tackle having a base member shaped and dimensioned for selective attachment to a support surface. An upstanding tubular column extends from the base member. A cover member is provided, wherein the cover member is shaped and dimensioned for selectively covering the upstanding tubular column in a manner such that the cover member can be moved between a closed configuration wherein the upstanding tubular column is hidden under the cover member and an open configuration wherein the upstanding tubular column is exposed for access by an individual using the device.

17 Claims, 7 Drawing Sheets

(56) References Cited

U.S. PATENT DOCUMENTS

| | | | | |
|---|---|---|---|---|
| 2,675,640 A * | 4/1954 | Adamek | A01K 97/06 | 206/315.11 |
| 2,693,662 A * | 11/1954 | Norton | A01K 97/06 | 43/57.1 |
| 2,702,442 A * | 2/1955 | Wallen | A01K 97/06 | 43/57.1 |
| 2,765,576 A * | 10/1956 | Kurek | A01K 97/06 | 312/289 |
| 2,813,368 A * | 11/1957 | Knowles | A01K 97/06 | 43/57.1 |
| 2,830,399 A * | 4/1958 | Davis | A01K 97/06 | 43/57.1 |
| 2,927,395 A * | 3/1960 | Bartlett | A01K 97/06 | 43/57.2 |
| 3,166,866 A * | 1/1965 | Norton | A01K 97/06 | 312/73 |
| 3,180,053 A * | 4/1965 | Norton | A01K 97/06 | 43/57.2 |
| 3,213,564 A | 10/1965 | Borell | | |
| 3,378,134 A * | 4/1968 | Wilkinson | A01K 97/06 | 206/315.11 |
| 4,049,165 A * | 9/1977 | Goldhaft | A01K 89/08 | 224/236 |
| 4,628,628 A * | 12/1986 | Burgin | A01K 97/08 | 224/616 |
| 4,805,859 A * | 2/1989 | Hudson | A01K 97/06 | 224/406 |
| 4,999,943 A * | 3/1991 | Crabtree | A01K 97/06 | 43/54.1 |
| 5,148,948 A * | 9/1992 | Granville | A47K 5/12 | 222/173 |
| 5,182,878 A | 2/1993 | Clark | | |
| 5,297,676 A * | 3/1994 | Coleman | A01K 97/06 | 206/315.11 |
| 5,337,892 A | 8/1994 | Zaffina | | |
| 5,542,206 A * | 8/1996 | Lisch | A01K 97/06 | 43/54.1 |
| 5,799,787 A | 9/1998 | Talbot | | |
| 5,802,760 A * | 9/1998 | Campbell | A01K 97/06 | 206/315.11 |
| 5,813,528 A * | 9/1998 | Bliek | A01K 97/06 | 206/315.11 |
| 5,934,464 A * | 8/1999 | Vargo | A01K 97/06 | 206/815 |
| 6,481,150 B1 * | 11/2002 | Mahowald | A01K 97/06 | 43/57.1 |
| 6,595,655 B2 * | 7/2003 | Neeb | F42B 39/007 | 206/315.11 |
| 6,648,390 B1 * | 11/2003 | Yang | B25H 3/025 | 220/4.27 |
| 6,705,655 B2 * | 3/2004 | Yang | B25H 3/025 | 220/4.27 |
| 6,908,268 B1 * | 6/2005 | Hsieh | B63B 25/002 | 410/100 |
| 7,478,500 B1 * | 1/2009 | Pollock | A01K 97/06 | 206/315.11 |
| 7,627,980 B2 * | 12/2009 | Rathsack | A01K 97/06 | 43/57.1 |
| 8,806,803 B1 * | 8/2014 | Mitchell | A01K 97/06 | 43/54.1 |
| 2006/0086867 A1 * | 4/2006 | Wang | A47G 33/06 | 248/125.8 |
| 2006/0191188 A1 | 8/2006 | Peiser | | |
| 2007/0039231 A1 * | 2/2007 | Jenkins | A01K 97/06 | 43/21.2 |
| 2007/0220801 A1 * | 9/2007 | Clawson | A01K 97/06 | 43/57.1 |
| 2008/0237248 A1 * | 10/2008 | Dente | A61L 9/12 | 220/729 |
| 2008/0244957 A1 * | 10/2008 | Rathsack | A01K 97/06 | 43/57.1 |
| 2008/0271361 A1 | 11/2008 | Greaves | | |
| 2009/0188943 A1 * | 7/2009 | McCullough | A47K 5/12 | 222/173 |
| 2012/0006851 A1 * | 1/2012 | McCullough | A47K 5/12 | 222/173 |
| 2012/0187066 A1 * | 7/2012 | Redl | A47J 41/0038 | 215/11.2 |
| 2013/0031823 A1 * | 2/2013 | Arias | A01K 97/06 | 43/54.1 |
| 2016/0025264 A1 * | 1/2016 | Casagrande | F16M 13/00 | 248/205.9 |
| 2017/0045217 A1 * | 2/2017 | Bowden | A01K 97/06 | |
| 2018/0317472 A1 * | 11/2018 | Moffett | A01K 97/06 | |
| 2022/0104473 A1 * | 4/2022 | Moffett | A01K 97/06 | |

* cited by examiner

DEVICE FOR THE STORAGE AND TRANSPORT OF FISHING TACKLE

BACKGROUND OF THE INVENTION

1. Field of the Invention

The present invention relates to devices for storing and transporting fishing tackle.

2. Description of the Related Art

Tackle boxes are an essential piece of equipment for fishermen and need to be convenient when on watercraft. Conventional horizontal tackle boxes generally have a main housing, a hinged lid, and trays for holding tackle, lures and fishing leaders. Such horizontal tackle boxes are similar to tool boxes. A common problem with conventional tackle boxes is it is difficult to store all of a fisherman's tackle without the tackle becoming a tangled mess and in the way of the fisherman while fishing from a watercraft.

A fisherman may have a number of hooks and lures pre-prepared on leaders for quick and easy attachment to a fishing line in order to save time while fishing. It is hard to organize fishing leaders and lures in a horizontal tackle box for easy access. It is quite common that the fishing leaders become entangled and cannot be detangled. Additionally, conventional tackle boxes can take up floor space in watercraft which can be stumbled over in the excitement of reeling in a fish.

Therefore, a need exists for an improved tackle box that can be conveniently mounted near the fisherman while fishing, removed after fishing has concluded, and transported. Further, the tackle box needs to provide a neat and orderly system for organizing and storing a plurality of fishing leaders, lures, and other tackle such that they will be easily accessible while fishing.

SUMMARY OF THE INVENTION

It is, therefore, an object of the present invention to provide a device for the transport and storage of fishing tackle. The device includes a base member shaped and dimensioned for selective attachment to a support surface and an upstanding tubular column extending from the base member. A cover member attachable to the base member is provided, wherein the cover member is shaped and dimensioned for selectively covering the upstanding tubular column in a manner such that the cover member can be moved between a closed configuration wherein the upstanding tubular column is hidden under the cover member and an open configuration wherein the upstanding tubular column is exposed for access by an individual using the device.

It is also an object of the present invention to provide a device for the transport and storage of fishing tackle including a mounting plate to which the base member is selectively attached. The mounting plated is adapted to be secured to the support surface.

It is another object of the present invention to provide a device for the transport and storage of fishing tackle wherein the upstanding tubular column is covered with a resilient sleeve.

It is yet another object of the present invention to provide a device for the transport and storage of fishing tackle further including a coupling rod which is extendable from the upstanding tubular column and the base member.

It is further object of the present invention to provide a device for the transport and storage of fishing tackle wherein the coupling rod is externally threaded on opposite ends thereof and cooperates with an internal thread formed in the base member when rotated to extend from the upstanding tubular column and base member.

It is another object of the present invention to provide a device for the transport and storage of fishing tackle wherein the cover member includes a handle.

It is also an object of the present invention to provide a device for the transport and storage of fishing tackle wherein the cover member and base member are selectively connected to one another by angled grooves on one member cooperating with projections on the other member.

It is another object of the present invention to provide a device for the transport and storage of fishing tackle including a plurality of storage compartments formed in the base member.

It is a further object of the present invention to provide a device for the transport and storage of fishing tackle including sliding cover members which cover the plurality of storage compartments formed in the base member.

It is still a further object of the present invention to provide the cover member with a downwardly extending stabilizing projection shaped and dimensioned to fit within upstanding tubular column.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
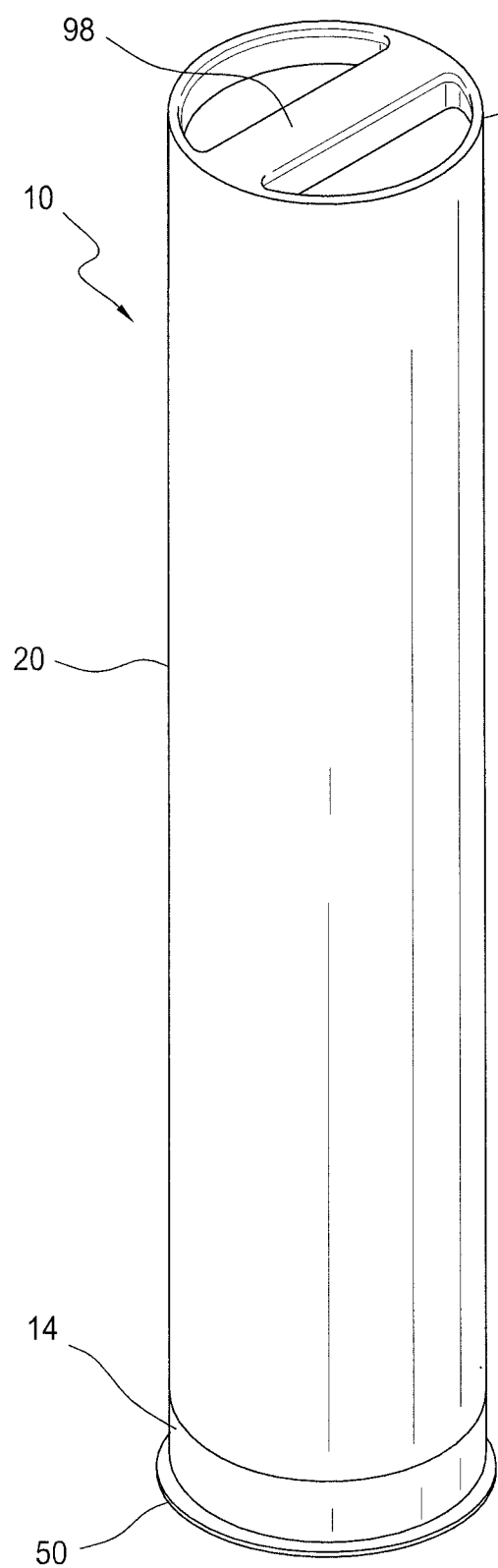
FIG. 1 is a perspective view showing the present device for the transport and storage of fishing tackle in its closed configuration.

With reference to FIGS. 1 to 13, a device 10 for the transport and storage of fishing tackle 12 (shown in broken lines in FIG. 2) is disclosed. As best shown in the exploded view in FIG. 3, the device 10 includes a base member 14 and an upstanding tubular column 18 extending from the base member 14. The base member 14 is shaped and dimensioned for selective attachment to a support surface 15 of, for example, a watercraft 16. The upstanding tubular column 18 is selectively covered by a cover member 20 shaped and dimensioned for covering the upstanding tubular column 18 in a manner such that the cover member 20 can be moved between a closed configuration wherein the upstanding tubular column 18 is hidden under the cover member 20 (see FIG. 1) and an open configuration wherein the cover member 20 is removed and the upstanding tubular column 18 is exposed for access by an individual using the device 10 (see FIG. 2). While the present device 10 is disclosed herein for use in conjunction with watercraft, it is appreciated the present device 10 may be used in conjunction with a variety of support surfaces.

The base member 14 is substantially cylindrical and includes an upper end 22 and a lower end 24. A sidewall 26 extends between the upper end 22 and the lower end 24.

In accordance with a preferred embodiment, and with particular reference to FIGS. 2, 3, 4, 6, and 7, the base member 14 is provided with a plurality of storage compartments 28 that may be accessed from the upper end 22. In particular, the base member 14 includes a central tubular structure 30 around which is positioned an outer wall 32 that defines the sidewall 26 of the base member 14. Between the central tubular structure 30 and the outer wall 32 an annular space 34 is defined. The annular space 34 is divided into a plurality of storage compartments 28 by a plurality of dividing members 36 that are positioned to radially extend between the central tubular structure 30 and the outer wall 32.

Access to the plurality of storage compartments 28 is achieved by providing the upper end 22 with sliding cover members 38a, 38b such that the sliding cover members 38a, 38b can be slid relative to each other so as to expose various storage compartments 28 defined within the annular space 34 between the central tubular structure 30 and the outer wall 32. The sliding cover members 38a, 38b are secured along the upper end 22 of the base member 14 by the provision of grooves 40, 42 at the upper ends 44, 46 of the central tubular structure 30 and the outer wall 32. As such, the edges of the sliding cover members 38a, 38b fit within the grooves 40, 42 along the upper ends 44, 46 of the central tubular structure 30 and the outer wall 32. Two vertically separated grooves 40, 42 are formed along each of the central tubular structure 30 and the outer wall 32 such that first and second sliding cover members 38a, 38b may be respectively secured therein and may be rotated relative to each other while still covering the plurality of storage compartments 28 as desired.

The present device 10 for the transport and storage of fishing tackle 12, and in particular the base member 14, is adapted for attachment to a horizontal surface of a watercraft 16 so as to allow for ready access by a user thereof. With this in mind, and with particular reference to FIGS. 3, 5, 6, 7, 9, and 12, a mounting plate 50 is provided for attachment to the support surface 15 along the watercraft 16. The mounting plate 50 is a generally disk shaped member and includes an upper surface 52 and a lower surface 54. The mounting plate 50 is provided with a series of screw holes 56 extending between the upper surface 52 thereof and the lower surface 54 thereof. The screw holes 56 allow users to selectively position the mounting plate 50 at a desired location on the watercraft 16.

As will be appreciated by the following disclosure, the mounting plate 50 is shaped and dimensioned for selective attachment to the base member 14, and the upper surface 52 of the mounting plate 50 and the lower end 24 of the base member 14 are shaped and dimensioned to allow for selective attachment. In accordance with a preferred embodiment, the base member 14 and the mounting plate 50 are selectively connected with a bayonet type coupling mechanism. While a bayonet type coupling mechanism is disclosed in accordance with a preferred embodiment of the present invention, other coupling structures may be employed without departing from the spirit of the present invention.

The upper surface 52 of the mounting plate 50 is provided with an upstanding annular wall 58 shaped and dimensioned to fit within an annular recess 59 defined along the lower end 24 of the base member 14. As the prior discussion regarding the structure of the base member 14 generally discloses, the annular recess 59 is defined by the central tubular structure 30 and the outer wall 32. The upper portion of the annular recess 59 is defined by the bottom wall 61 of the plurality of storage compartments 28 discussed above.

Figures 4, 5:
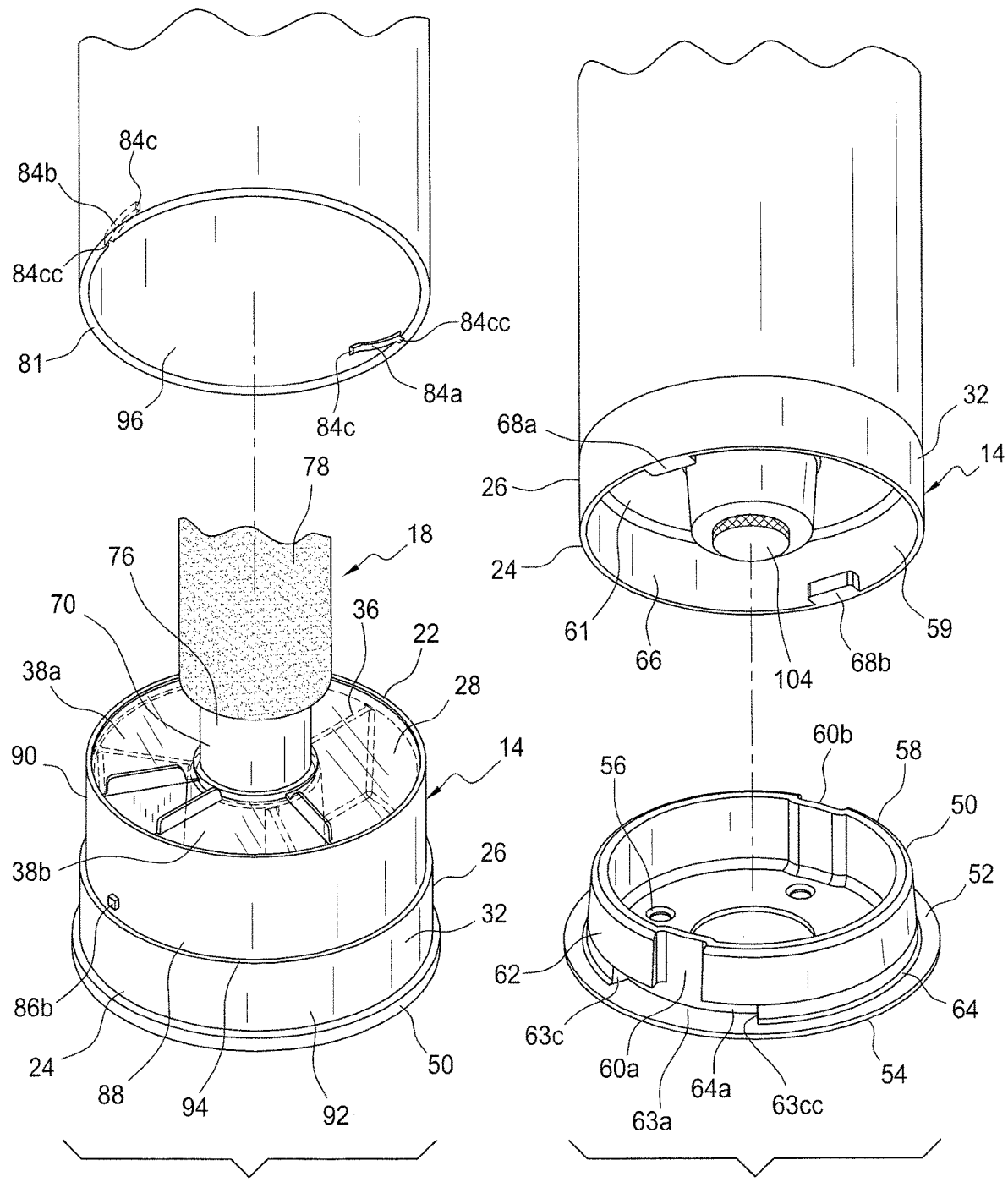
FIG. 4 is a close up perspective view showing the base member of the present invention with the cover member being removed.
FIG. 5 is a close up perspective view showing the base member of the present invention removed from the mounting plate.
Figure 9:
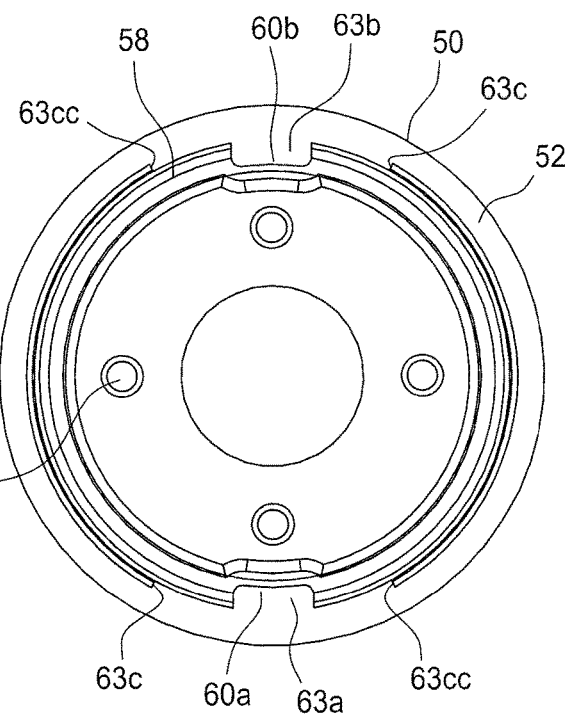
FIG. 9 is a top view of the mounting plate of the present invention.
Figure 10:
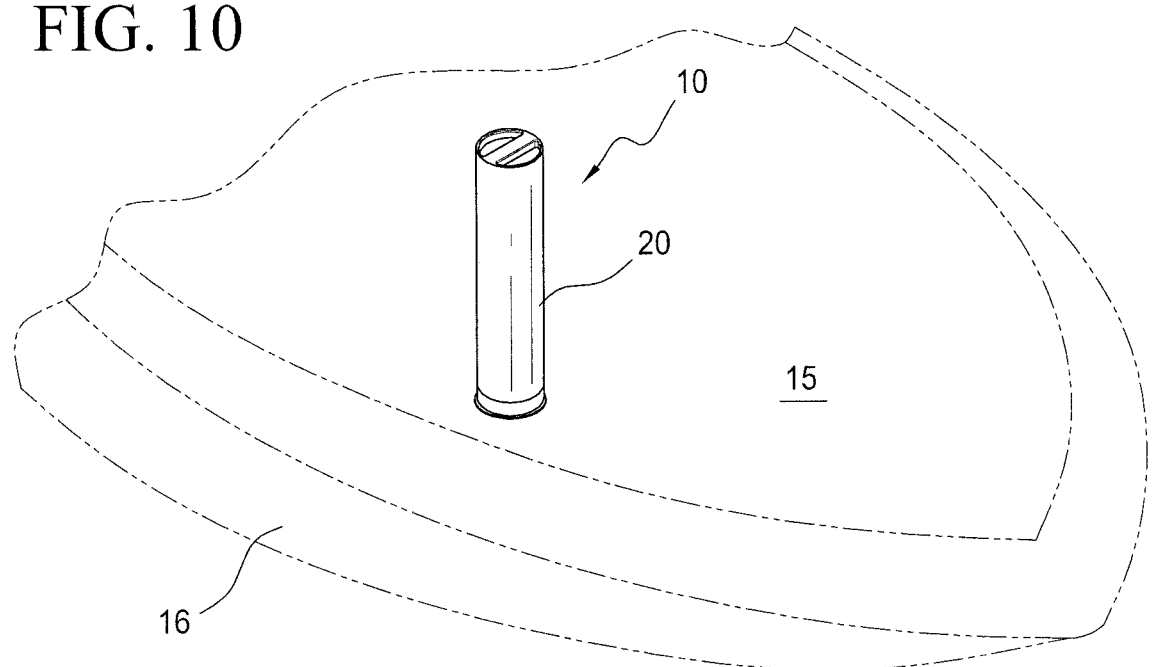
FIG. 10 is a perspective view showing the present invention in its closed configuration mounted to a support surface of a watercraft.
Figure 11:
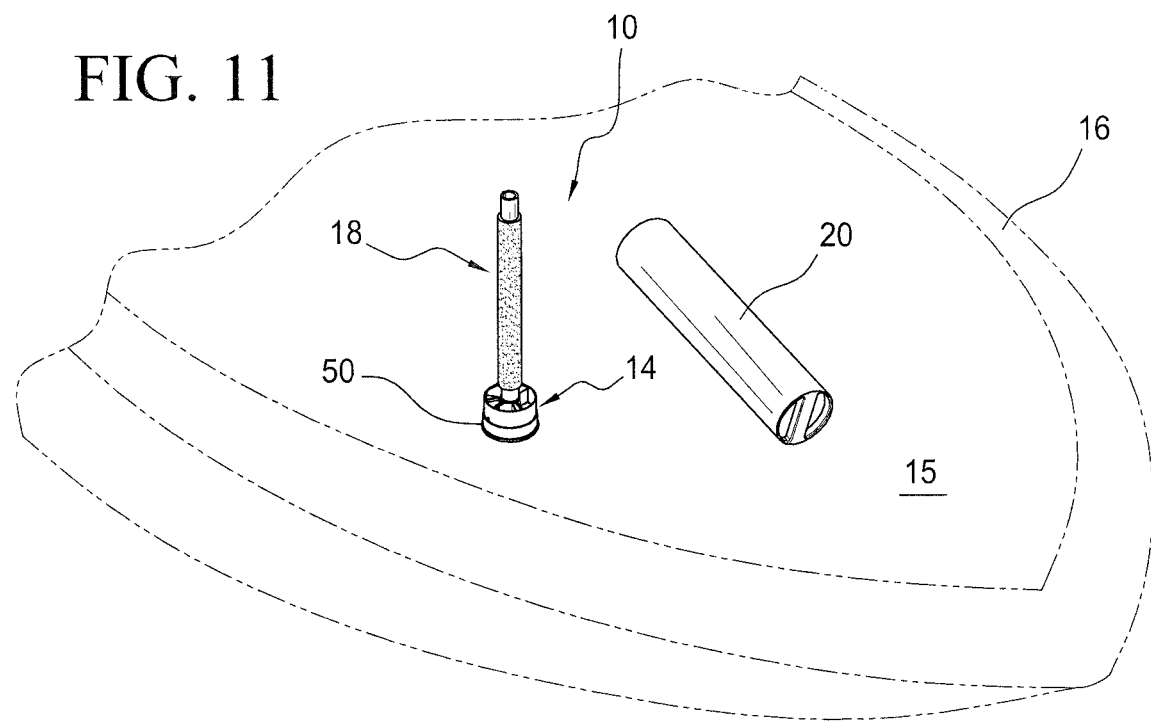
FIG. 11 is a perspective view showing the present invention in its open configuration mounted to a support surface of a watercraft.
Figure 12:
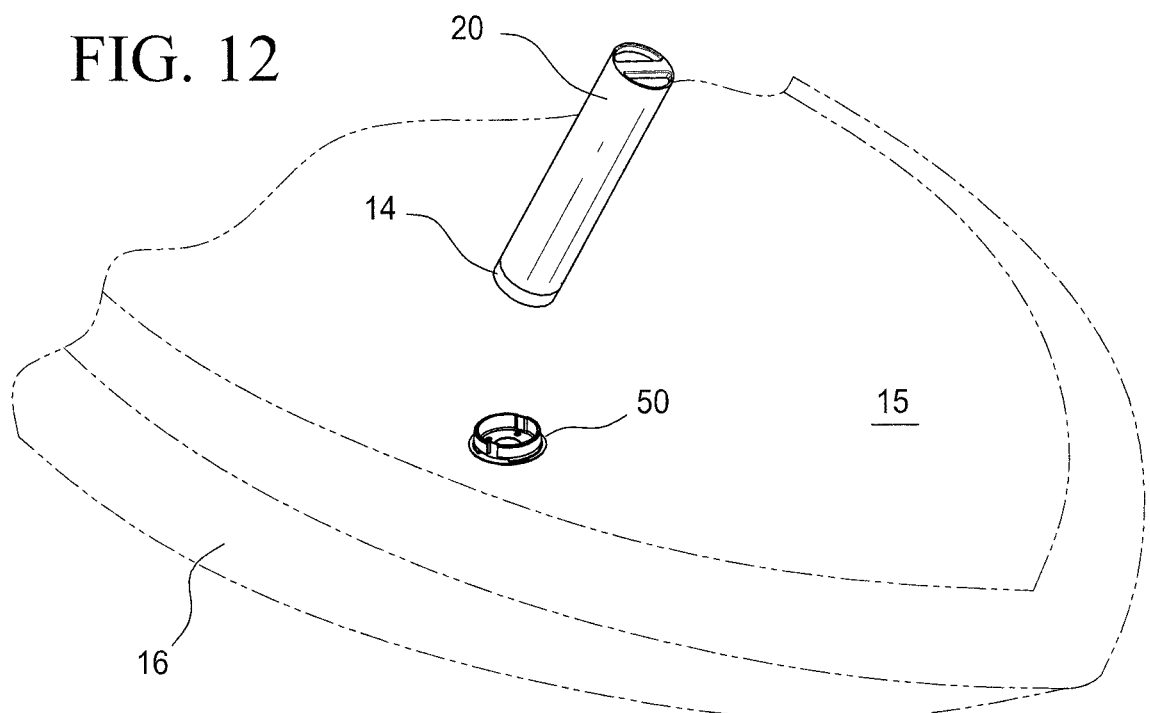
FIG. 12 is a perspective view showing the present invention removed from the mounting plate which is secured to the support surface of a watercraft.

The upper surface 52 of the mounting plate 50, and in particular the upstanding annular wall 58 includes first and second vertically oriented slots 60a, 60b along the outer surface 62 of the upstanding annular wall 58. At the base 64 of the upstanding annular wall 58, and in alignment with the first and second vertically oriented slots 60a, 60b, respectively, are first and second horizontally oriented slots 64a, 64b. The first and second horizontally oriented slots 64a, 64b are perpendicular to the first and second vertically oriented slots 60a, 60b. The first and second horizontally oriented slots 64a, 64b intersect with the first and second vertically oriented slots 60a, 60b to form T-shaped slots 63a, 63b wherein the cross bars (that is, the first and second horizontally oriented slots 64a, 64b) of the T-shaped slots 63a, 63b end in abutments 63c and 63cc formed by upstanding annular wall 58, as best shown in FIGS. 5 and 9.

As to the lower end 24 of the base member 14, the interior surface 66 of the outer wall 32 at the lowest most edge thereof is provided with radial projections 68a, 68b shaped in a manner to pass through the vertically oriented slots 60a, 60b and into the horizontally oriented slots 64a, 64b such that the base member 14 may be rotated in a counterclockwise direction until radial projections contact abutments 63cc locking the base member 14 relative to the mounting plate 50 or the base member 14 may be rotated in a clockwise direction until radial projections 68a, 68b contact abutments 63c locking the base member 14 relative to the mounting plate 50.

As discussed above, the present device 10 for the transport and storage of fishing tackle 12 is provided with an upstanding tubular column 18. The upstanding tubular column 18 is adapted for selective attachment of fishing tackle 12 thereto. In particular, hooks and other sharp structures may be selectively pushed into the upstanding tubular column 18 and are frictionally retained thereby.

Figure 2:
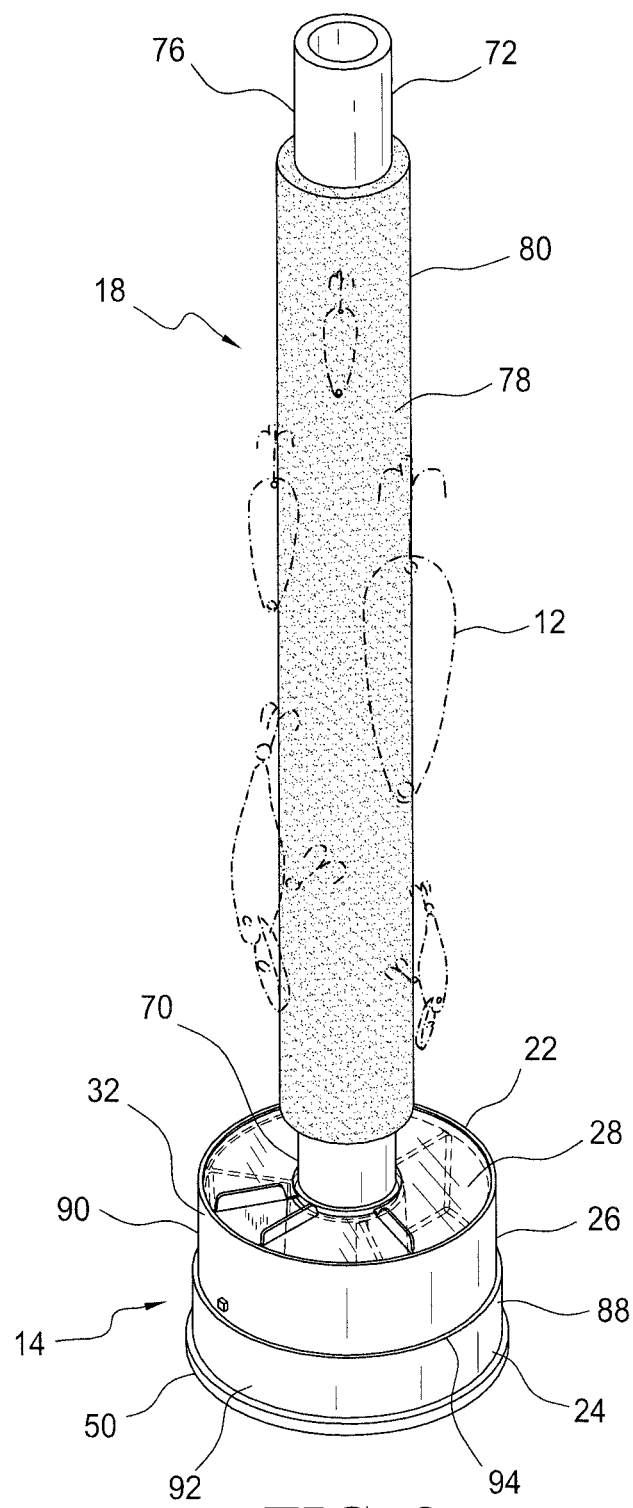
FIG. 2 is a perspective view showing the present device for the transport and storage of fishing tackle in its open configuration.
Figure 3:
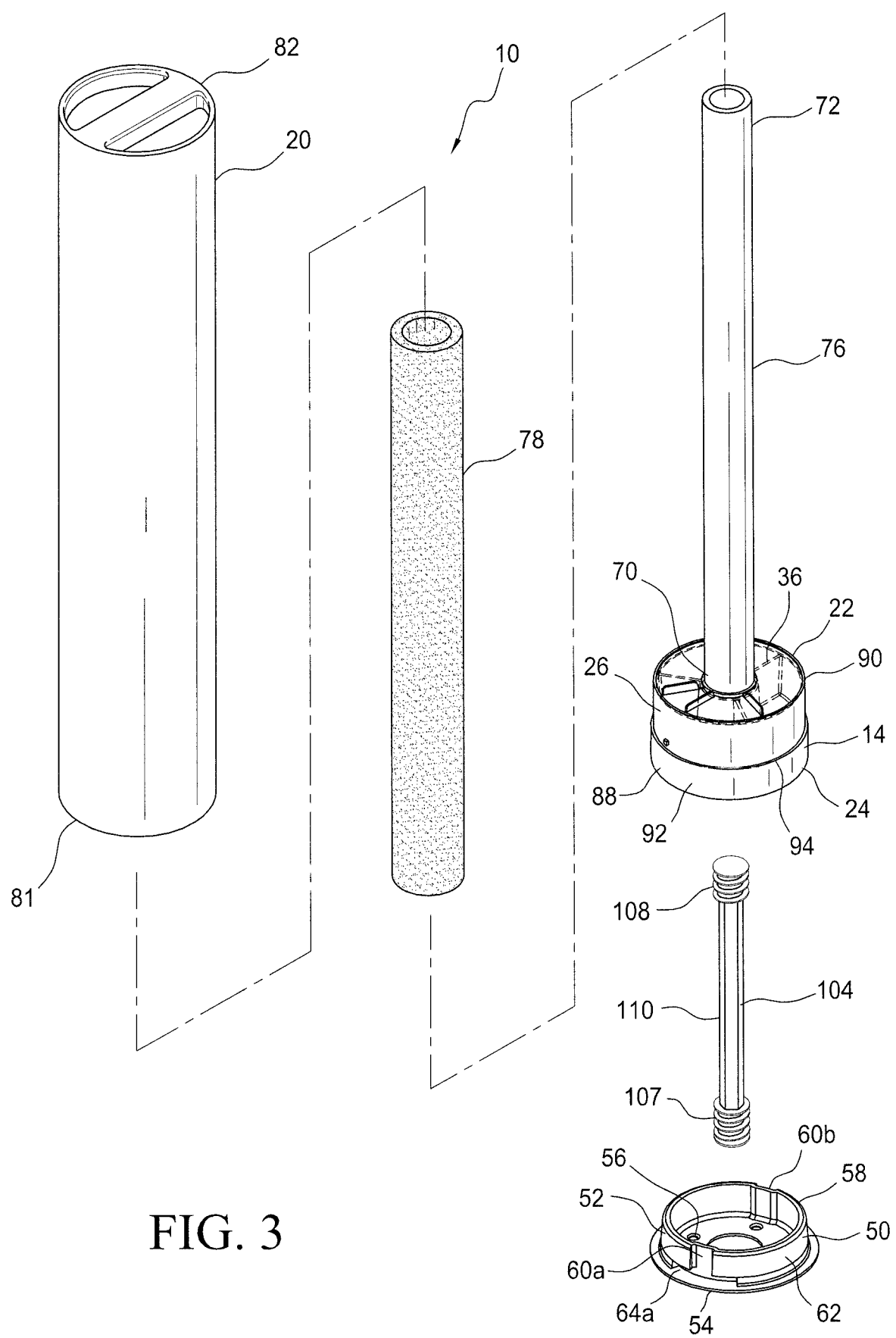
FIG. 3 is an exploded perspective view showing the component parts of the present device for the transport and storage of fishing tackle.
Figure 6:
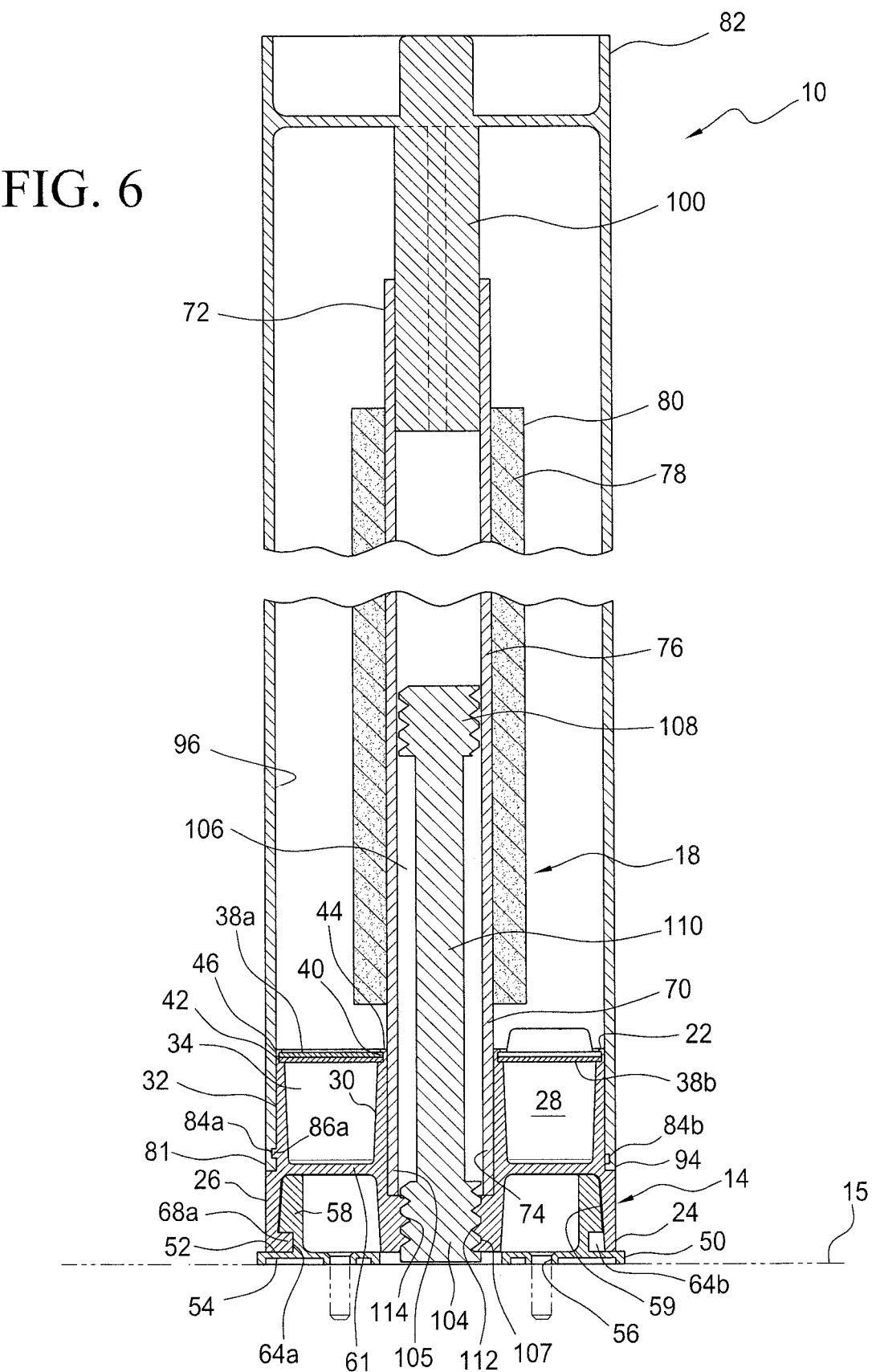
FIG. 6 is a cross sectional view showing the present invention mounted to a support surface.
Figure 7:
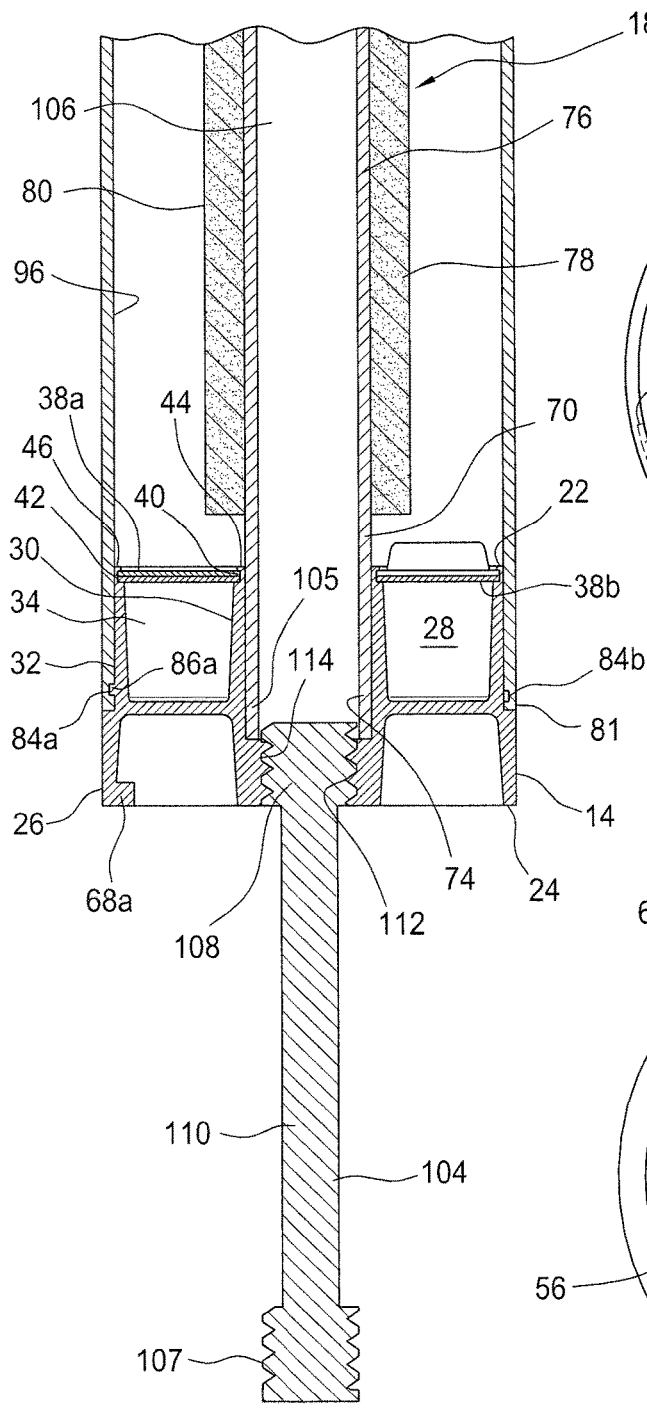
FIG. 7 is a cross sectional view of the present invention showing the coupling rod extended from the central tubular structure.
Figure 8:
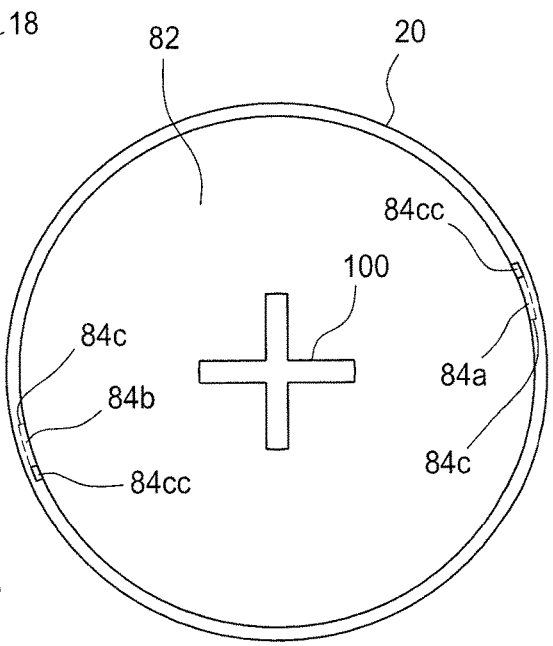
FIG. 8 is a bottom view looking into the cover member of the present invention.

With this in mind, and with particular reference to FIGS. 2, 3, and 6, the upstanding tubular column 18 includes a first end 70 secured to the central tubular structure 30 of the base member 14 and a free second end 72. In accordance with a preferred embodiment, the first end 70 of the upstanding tubular column 18 is positioned within a hole 74 defined by the central tubular structure 30 of the base member 14. The upstanding tubular column 18 extends upwardly between the first end 70 thereof and the second end 72 thereof along a longitudinal axis that is substantially perpendicular to the plane in which the base member 14 lies.

The upstanding tubular column 18 includes a rigid cylindrical support member 76 over which is positioned a resilient sleeve 78 of foam or other resilient material. As such, and to the extent the resilient sleeve 78 covers the rigid cylindrical support member 76, the outer surface 80 of the upstanding tubular column 18 is structured so as to allow fishing tackle 12 to be pressed and frictionally retained thereby. In accordance with a preferred embodiment, the resilient sleeve 78 is adapted to extend from a position slightly below the second end 72 of the upstanding tubular column 18 and a position slightly above the first end 70 of the upstanding tubular column 18.

The cover member 20 is a cylindrical tubular member shaped in a manner to fit over the upstanding tubular column 18 so as to selectively cover the upstanding tubular column 18. The cover member 20 includes an open first end 81 and a closed second end 82. Secure attachment of the cover member 20 over the upstanding tubular column 18 is achieved by the selective attachment of the cover member 20 to both the base member 14 and to the upstanding tubular column 18.

Referring to FIG. 4, the open first end 81 of the cover member 20, along its inner surface 96, is provided with first and second angled grooves 84a, 84b shaped and dimensioned to engage projections 86a, 86b along the outer surface 88 of the sidewall 26 of the base member 14. In particular, the outer surface 88 of the base member 14 along the upper half 90 of the base member 14 is slightly smaller in diameter than the outer surface 88 of the base member along the lower half 92 of the base member 14, and a ridge 94 is defined therebetween. The open first end 81 of the cover member 20 has an inner diameter slightly larger than the diameter along the outer surface 88 of the base member 14 at the upper half 90 of the base member 14. The open first end 81 of the cover member 20 has an outer diameter that is approximately the same as the outer diameter along the outer surface 88 of the base member 14 at the lower half 92 of the base member 14. As such, the cover member 20 is shaped and dimensioned to fit over the upper half 90 of the base member 14, while the open first end 81 is of the same diameter as the lower half 92 of the base member 14 and therefore simply sits on the ridge 94 formed between the upper half 90 and the lower half 92 of the base member 14 when the cover member 20 is secured over the upstanding tubular column 18.

As discussed above, and with reference to FIGS. 4, 6, 7 and 8, the inner surface 96 of the cover member 20 is provided at its open first end 81 with angled grooves 84a, 84b and the upper half 90 of the base member 14 is provided with projections 86a, 86b shaped and dimensioned for engagement with the angled grooves 84a, 84b. The projections 86a, 86b engage the angled grooves 84a, 84b so as to allow for a twist and lock coupling relationship between the base member 14 and the cover member 20. Twisting of the cover member 20 relative to the base member 14 is facilitated by the provision of a handle member 98 along the exterior surface of the cover member 20 at the closed second end 82 thereof. Due to the shape of angled grooves 84a, 84b, when the cover member 20 is turned in a clockwise direction the cover member 20 becomes locked to the base member 14 when projections 86a, 86b make contact with the respective ends 84c of angled grooves 84a, 84b. When turned in a counterclockwise direction the cover member 20 unlocks from the base member 14 when projections 86a, 86b reach the respective ends 84cc of angled grooves 84a and 84b and the cover member 20 can be removed from the base member 14. It is contemplated that the angle of the grooves 84a, 84b could be reversed such that counterclockwise turning of the cover member 20 results in the cover member 20 locking to the base member 14 and clockwise turning of the cover member 20 results in the cover member 20 unlocking from the base member 14.

As discussed above, the base member 14 locks to the mounting plate 50 when it is rotated in either the clockwise or counterclockwise direction. This is important as once the base member 14 is locked to the mounting plate 50 rotation of the cover member 20 results in locking and unlocking of the cover member 20 upon the base member 14. Thus, when the base member 14 is secured to the support surface 15 locking and unlocking the cover member 20 to the base member 14 is a two-step process. First the base member 14 locks with the mounting plate 50 and then the cover member 20 locks or unlocks from the base member 14. As those skilled in the art will appreciate, the rotation of the cover member 20 relative to the base member 14 should be coordinated with the rotation of the base member 14 relative to the mounting plate 50 to insure proper locking and unlocking occurs between the mounting plate 50, base member 14 and cover member 20. Accordingly, locking of the cover member 20 on the base member 14 results in initial rotation of the base member 14 in a clockwise direction until radial projections 68a, 68b contact abutments 63c in a manner allowing for locking of the base member 14 relative to the mounting plate 50 and then continued rotation of the cover member 20 until the end 84c of the angled grooves 84a, 84b is reached locking the cover member 20 to the base member 14 relative to the mounting plate 50.

The solid connection between the cover member 20 and the upstanding tubular column 18 is further facilitated by providing the closed second end 82 of the cover member 20 with a downwardly extending stabilizing projection 100 shaped and dimensioned to fit within the center of the rigid cylindrical support member 76 of the upstanding tubular column 18 (see FIG. 6).

Figure 13:
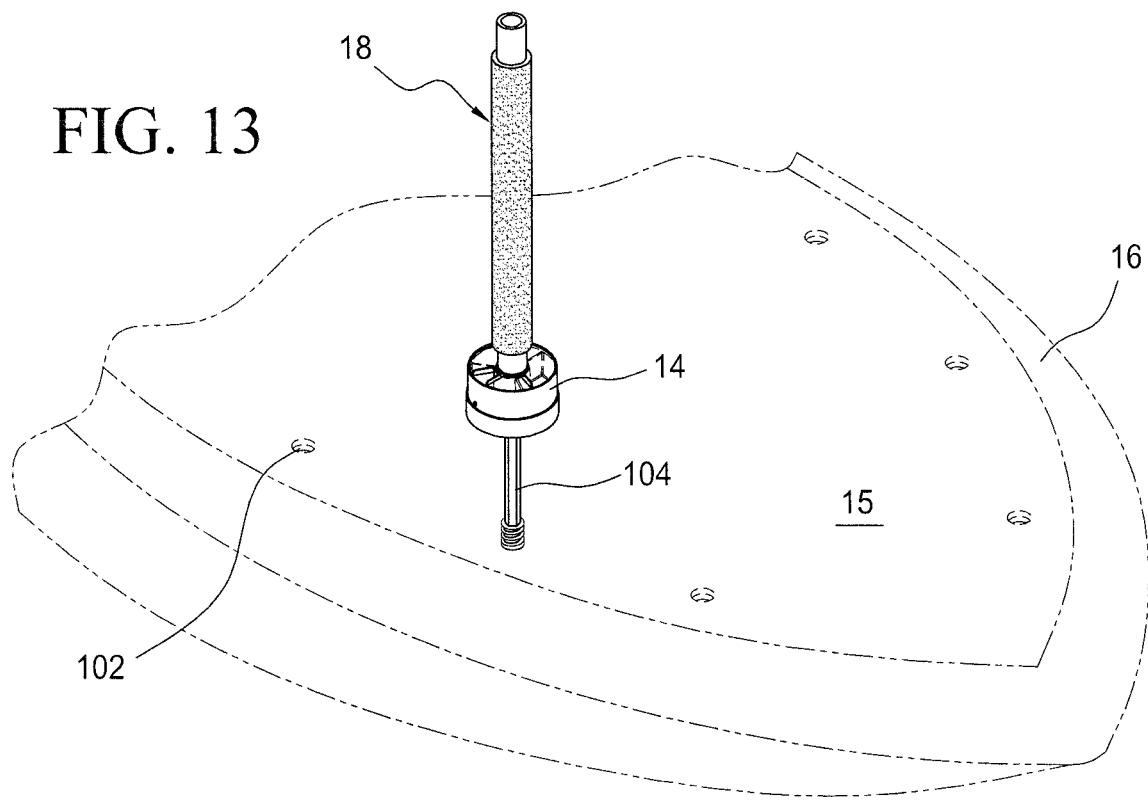
FIG. 13 is a perspective view showing the present invention with the coupling rod extended and mounted to a threaded hole on a watercraft.

As those skilled in the art appreciate, watercrafts 16 are often constructed with hollow receptacles 102, which appear as apertures in FIG. 13, for holding fishing rods or seats as well as other accessories. These hollow receptacles 102 may be used for the attachment of the present device 10 for the transport and storage of fishing tackle 12.

In particular, and with reference to FIGS. 3, 6, 7, and 13, a coupling rod 104 is provided and is stored within the central cavity 105 defined by the central tubular structure 30 of the base member 14 and the central cavity 106 of the rigid cylindrical support member 76 of the upstanding tubular column 18. The coupling rod 104 is selectively held in first and second positions by selectively connecting the coupling rod 104 to the central tubular structure 30.

In particular, the coupling rod 104 includes a threaded first end 107 and a threaded second end 108 with a support rod 110 therebetween. The threaded first end 107 and the threaded second end 108 are structured for threaded engagement with internal threads 112 formed along the inner surface 114 of the central tubular structure 30 adjacent the lower surface of the base member 14. In this way, and when it is desired to store the coupling rod 104 and make use of the mounting plate 50 discussed above for attachment of the present device 10 to a watercraft 16, the threaded second end 108 of the coupling rod 104 is positioned within the central cavity 105 defined by the central tubular structure 30 of the base member 14 and the central cavity 106 of the rigid cylindrical support member 76 of the upstanding tubular column 18, while the threaded first end 107 of the coupling rod 104 is threaded to the internal threads 112 along the inner surface 114 of the central tubular structure 30.

When, however, it is desired to extend the coupling rod 104 and use it for attachment in hollow receptacle 102 formed along the support surface 15 of the watercraft 16, the threaded attachment between the threaded first end 107 of the coupling rod 104 and the internal threads 112 along the inner surface 114 of the central tubular structure 30 is released. It should be noted the threaded first end 107 of the coupling rod 104 and the internal threads 112 along the inner surface 114 of the central tubular structure 30 are formed such that rotation releasing the engagement will cause the threaded first end 107 of the coupling rod 104 to move out of the central tubular structure 30 in a direction away from the upstanding tubular column 18. Once the threaded first end 107 is detached from the central tubular structure 30, the coupling rod 104 is pulled from the base member 14 until the threaded second end 108 of the coupling rod 104 comes into contact with the internal threads 112. At this point the coupling rod 104 may be rotated relative to the base member 14 to secure the threaded second end 108 to the internal threads 112 along the inner surface 114 of the central tubular structure 30. Once the threaded second end 108 is secured to the base member 14, the threaded first end 107 may be secured within a hollow receptacle 102 formed along the support surface 15 of the watercraft 16.

It is contemplated to enhance attachment, that stabilizing projection 100 includes threads which mate with threads formed in the second end 72 of the upstanding tubular column 18 to thereby lock the cover member 20 to the upstanding tubular column 18 and in turn the base member 14. This connect could be used with or without the locking created by projections 86a, 86b with angled grooves 84a, 84b. Additionally, the mounting plate 50 could also include external threads which would mate with internal threads on the base member 14 to further enhance the connection of the base member 14 to the mounting plate 50. While details of certain embodiments of the present invention are described, they are provided as illustrative examples so as to enable those of ordinary skill in the art to practice the invention. The details provided are not meant to limit the scope of the present invention, but to be exemplary.

The invention claimed is:

1. A device for the transport and storage of fishing tackle, comprising:
    a base member having an upper surface and a lower surface wherein the lower surface is shaped and dimensioned for selective attachment to and resting upon a support surface;
    an upstanding tubular column connected to and extending from the base member;
    a coupling rod having a first end and an opposite second end extending into the upstanding tubular column and the first end is extendable from the upstanding tubular column and through the base member such that the second opposite end extends into the base member; and
    a cover member attachable to the base member wherein the cover member is shaped and dimensioned for selectively covering the upstanding tubular column in a manner such that the cover member can be moved between a closed configuration wherein the upstanding tubular column is hidden under the cover member and an open configuration wherein the upstanding tubular column is exposed for access of the fishing tackle being stored within the device by an individual using the device.

2. The device for the transport and storage of fishing tackle of claim 1, further including a mounting plate to which the base member is selectively attached, the mounting plate is adapted to be secured to the support surface.

3. The device for the transport and storage of fishing tackle of claim 1, wherein the upstanding tubular column is covered with a resilient sleeve.

4. The device for the transport and storage of fishing tackle of claim 1, wherein the coupling rod is externally threaded on opposite ends thereof and cooperates with an internal thread formed in the base member when rotated to extend from the upstanding tubular column and base member.

5. The device for the transport and storage of fishing tackle of claim 1, wherein the cover member includes a handle.

6. The device for the transport and storage of fishing tackle of claim 1, wherein the cover member and base member are selectively connected to one another by angled grooves on one member cooperating with projections on the other member.

7. The device for the transport and storage of fishing tackle of claim 1, further including a plurality of storage compartments formed in the base member.

8. The device for the transport and storage of fishing tackle of claim 7, further including sliding cover members which cover the plurality of storage compartments formed in the base member.

9. The device for the transport and storage of fishing tackle of claim 1, wherein the cover member includes a downwardly extending stabilizing projection shaped and dimensioned to fit within the upstanding tubular column.

10. A device for the transport and storage of fishing tackle, comprising:
    a base member shaped and dimensioned for selective attachment to a support surface, the base member includes a sidewall with spaced external projections;
    an upstanding tubular column extending from the base member, the upstanding tubular column including a coupling rod extendable therefrom; and
    a cover member attachable to the base member, the cover member including spaced internal angled grooves which cooperate with the spaced external projections to form a twist and lock coupling relationship between the base member and the cover member when the cover member is rotated, and wherein the cover member is shaped and dimensioned for selectively covering the upstanding tubular column in a manner such that the cover member can be moved between a closed configuration wherein the upstanding tubular column is hidden under the cover member and an open configuration wherein the upstanding tubular column is exposed for access of the fishing tackle being stored within the device by an individual using the device.

11. The device for the transport and storage of fishing tackle of claim 10, further including a mounting plate to which the base member is selectively attached, the mounting plate is adapted to be secured to the support surface.

12. The device for the transport and storage of fishing tackle of claim 10, wherein the upstanding tubular column is covered with a resilient sleeve.

13. A device for the transport and storage of fishing tackle, comprising:
- a base member shaped and dimensioned for selective attachment to a support surface, the base member includes a sidewall with spaced external projections;
- an upstanding tubular column extending from the base member, the upstanding tubular column including a coupling rod extendable therefrom; and
- a cover member attachable to the base member, the cover member including spaced internal angled grooves which cooperate with the spaced external projections to form a twist and lock coupling relationship between the base member and the cover member when the cover member is rotated, and wherein the cover member is shaped and dimensioned for selectively covering the upstanding tubular column in a manner such that the cover member can be moved between a closed configuration wherein the upstanding tubular column is hidden under the cover member and an open configuration wherein the upstanding tubular column is exposed for access by an individual using the device; and wherein the coupling rod is externally threaded on opposite ends thereof and cooperates with an internal thread formed in the base member when rotated to extend from the upstanding tubular column and base member.

14. The device for the transport and storage of fishing tackle of claim 10, wherein the cover member includes a handle.

15. The device for the transport and storage of fishing tackle of claim 10, further including a plurality of storage compartments formed in the base member.

16. The device for the transport and storage of fishing tackle of claim 15, further including sliding cover members which cover the plurality of storage compartments formed in the base member.

17. The device for the transport and storage of fishing tackle of claim 10, wherein the cover member includes a downwardly extending stabilizing projection shaped and dimensioned to fit within the upstanding tubular column.

* * * * *